(12) United States Patent
Casellas et al.

(10) Patent No.: US 11,572,272 B2
(45) Date of Patent: Feb. 7, 2023

(54) PROCESS FOR PRODUCING A HYDROGEN STORAGE MEANS

(71) Applicant: GKN Sinter Metals Engineering GmbH, Radevormwald (DE)

(72) Inventors: Antonio Casellas, Siegburg (DE);
Klaus Dollmeier, Westhausen (DE);
Eberhard Ernst, Eichenzell (DE);
René Lindenau, Radevormwald (DE);
Anastasia Özkan, Witten (DE); Lars Wimbert, Schwelm (DE)

(73) Assignee: GKN Sinter Metals Engineering GmbH, Radevormwald (DE)

(*) Notice: Subject to any disclaimer, the term of this patent is extended or adjusted under 35 U.S.C. 154(b) by 251 days.

(21) Appl. No.: 16/673,088

(22) Filed: Nov. 4, 2019

(65) Prior Publication Data
US 2020/0062589 A1 Feb. 27, 2020

Related U.S. Application Data

(63) Continuation of application No. 15/307,142, filed as application No. PCT/EP2015/059706 on May 4, 2015, now abandoned.

(51) Int. Cl.
*B32B 9/00* (2006.01)
*C01B 3/00* (2006.01)
*C09K 5/14* (2006.01)

(52) U.S. Cl.
CPC .......... *C01B 3/0078* (2013.01); *C01B 3/0021* (2013.01); *C01B 3/0031* (2013.01);
(Continued)

(58) Field of Classification Search
CPC ......... Y10T 428/30; B32B 9/007; H01B 1/04; H01B 1/24; C01B 2204/00; C01B 31/0438; C01B 31/0446; F28D 20/023
(Continued)

(56) References Cited

U.S. PATENT DOCUMENTS 5,653,951 A 8/1997 Rodriguez et al.
6,040,087 A 3/2000 Kawakami
(Continued)

FOREIGN PATENT DOCUMENTS

DE 3639545 C1 6/1988
DE 102005019132 A1 10/2006
(Continued)

OTHER PUBLICATIONS

PCT International Search Report, PCT/EP2015/059706, dated Aug. 6, 2015, 4 pages.
(Continued)

*Primary Examiner* — Daniel H Miller
(74) *Attorney, Agent, or Firm* — Quarles & Brady LLP (57) ABSTRACT

A process for producing a hydrogen storage means. Separate layers comprising a hydrogen-storing material and a heat-conducting material are introduced into a press mold. The separate layers of the hydrogen-storing material and the heat-conducting material are compressed together to generate a sandwich structure. The heat-conducting material, on use of the sandwich structure as hydrogen storage means, assumes the task of conducting heat.

20 Claims, 1 Drawing Sheet

(52) U.S. Cl.
CPC .............. *C01B 3/0084* (2013.01); *C09K 5/14* (2013.01); *Y02E 60/32* (2013.01)

(58) Field of Classification Search
USPC .................. 428/408; 165/185; 423/447.1
See application file for complete search history.

(56) References Cited

U.S. PATENT DOCUMENTS

| | | | |
|---|---|---|---|
| 6,318,453 | B1 | 11/2001 | Ovshinsky et al. |
| 6,329,101 | B1 | 12/2001 | Kawakami |
| 6,610,445 | B1 * | 8/2003 | Moriwaki ............. H01M 4/624 |
| | | | 429/218.2 |
| 2003/0116312 | A1 | 6/2003 | Krassowski et al. |
| 2006/0030483 | A1 | 2/2006 | Jang |
| 2010/0247424 | A1 | 9/2010 | Mao et al. |
| 2011/0142752 | A1 | 6/2011 | Yang et al. |
| 2011/0297879 | A1 | 12/2011 | Jorgensen et al. |
| 2013/0108940 | A1 | 5/2013 | Langan et al. |
| 2014/0295304 | A1 | 10/2014 | Langan et al. |
| 2015/0023846 | A1 | 1/2015 | Langan et al. |

FOREIGN PATENT DOCUMENTS

| | | |
|---|---|---|
| DE | 60030221 T2 | 7/2007 |
| DE | 602004005070 T2 | 11/2007 |
| DE | 102009005859 B3 | 4/2010 |
| DE | 102010015016 A1 | 11/2010 |
| DE | 102010005780 A1 | 7/2011 |
| DE | 102011103490 A1 | 3/2012 |
| EP | 0851515 A2 | 7/1998 |
| EP | 1348527 A2 | 10/2003 |
| EP | 1407877 A1 | 4/2004 |
| EP | 2221131 A1 | 8/2010 |
| JP | S609839 A | 1/1985 |
| JP | S60162702 A | 8/1985 |
| JP | S6140801 A | 2/1986 |
| JP | S62196499 A | 8/1987 |
| JP | H0773874 A | 3/1995 |
| JP | H10275631 A | 10/1998 |
| JP | 2005280164 A | 10/2005 |
| WO | 0113445 A1 | 2/2001 |
| WO | 2008006796 A1 | 1/2008 |
| WO | 2013036982 A2 | 3/2013 |

OTHER PUBLICATIONS

Sakintuna, et al. Metal Hydride Materials for Solid Hydrogen Storage: A Review, International Journal of Hydrogen Energy, 2007, 32:1121-1140.

Gao, Carbon Matrix Confined Sodium Alanate for Reversible Hydrogen Storage, University of Utrecht Thesis, Nov. 19, 2012, 128 pages.

Japan Patent Office, Notice of Reasons for Rejection, Application No. 2016-566653, dated Apr. 11, 2019, 14 pages.

Ruder, et al., Wet Powder Spraying—A Process for the Production of Coatings, Surface and Coatings Technology, 1992, 53(1):71-74.

* cited by examiner

PROCESS FOR PRODUCING A HYDROGEN STORAGE MEANS

This application is a continuation application of U.S. patent application Ser. No. 15/307,142 filed on Oct. 27, 2016 which represents the U.S. national stage entry of PCT International Application No. PCT/EP2015/059706 filed May 4, 2015, which claims the priority of German Patent Application No. 10 2014 006 372.0 filed May 5, 2014, the content disclosures of which is are hereby incorporated by reference into the subject matter of the present patent application.

The present invention relates to a hydrogen storage means comprising a hydrogen-permeable structure and to a process for producing a layer structure.

It is known that hydrogen is stored in cylindrical vessels into which sheets of a metal hydride/graphite composite material are inserted. These sheets must have high radial thermal conductivity in order to remove the heat that arises in the course of hydrogenation—exothermic intercalation. In the course of dehydrogenation, this heat has to be supplied again—endothermic operation. Since metals are good conductors of heat, but their hydrides are extremely poor conductors of heat, it is necessary to install them such that heat flow through a second material is assured. For this purpose, the metal or the metal hydride is mixed with graphite, for example, in which case the graphite assumes the function of heat conduction. This mixture is pressed, for example, axially to give cylinders or sheets or blocks or slabs, and inserted into a vessel, especially a tank. For this purpose, a mixture of expanded graphite having very low density is mixed with the hydrogenatable metal or the metal hydride, such that the expanded graphite becomes aligned transverse/at right angles to the pressing direction through the axial pressing. This gives rise to high thermal conductivity transverse to pressing direction.

EP-A-1 348 527, EP-A-2 221 131, EP-A-1 407 877 and JP-A-60162702 disclose processes and apparatuses for production of components using shaping molds, in which powders of at least two different compositions are introduced into a shaping mold or into a cavity of a shaping mold. Further processes of this kind are known, for example, in DE-B-10 2009 005 859, DE-A-10 2010 015 016, DE-T-60 2004 005 070 and WO-A-2013/036982.

Further hydrogen storage means approaches and constructions are known from DE-A-10 2011 103 490, DE-T-600 30 221, U.S. Pat. No. 6,318,453, US-A-2011/0142752 and US-A-2006/0030483.

It is an object of this invention to provide a material structure in which conduction of heat is assured, especially for prevention of overheating or excessive cooling in the course of dehydrogenation with accompanying loss of function of the hydrogen storage means.

This object is achieved by the invention by proposing a hydrogen storage element for a hydrogen storage means having the features of claim 1. Advantageous features, configurations and developments will be apparent from the description which follows, the figures and also the dependent claims, without restriction of individual features from a configuration thereto. Instead, one or more features from one configuration can be combined with one or more features of another configuration to give further configurations of the invention. More particularly, the respective independent and dependent claims can also each be combined with one another. Nor should the wording of the independent claim be regarded as a restriction of the subject matter claimed. One or more features of the claim wording can therefore be exchanged or else omitted, but may additionally also be added on. It is also possible to use features cited with reference to a specific working example in generalized form as well, or likewise to use them in other working examples, especially applications.

According to the invention, the hydrogen storage element comprises a heat-conducting material in thermal contact with the first material having hydrogen storage capacity. In this case, these two materials intermesh, meaning that they do not take the form of mere layers alongside one another. The heat-conducting second material projects into the first material having hydrogen storage capacity in subregions, i.e. has different three-dimensional distribution in this respect within the hydrogen storage element. This three-dimensional distribution may itself in turn have regular repeating structures, but this need not necessarily be the case. For example, it is conceivable that the second material is a film or ribbon which projects out of the plane or the film or ribbon in sections. By virtue of the inventive three-dimensional distribution of the heat-conducting second material, there is thus an increase in its surface area in thermal contact with the hydrogen-storing first material, which leads for good removal of heat in the course of hydrogenating and supply of heat in the course of dehydrogenating.

The heat-conducting second material thus extends within the compact both in the X and Y directions, i.e. in the direction of the second material, and in the Z direction, i.e. in the direction of the succession of several layers of first and second material.

Different three-dimensional distributions of the second material are particularly advantageous when it has a helical form. The second material in helical or spiral form effectively permeates the compact and is thus in thermal contact with the first material having hydrogen storage capacity over a large surface area contact.

In a further variant of the invention, a hydrogen storage means is proposed, having a hydrogen-permeable structure, preferably a porous structure, which is present as a compressed component in the hydrogen storage means and serves for flow of a hydrogenous gas.

The invention especially relates to a layered structure of hydrogen storage means, especially metal hydride storage means having graphite laminas of good thermal conductivity, such that the graphite can remove the large amounts of heat in the hydrogenation of the hydrogen storage means and supply them in the dehydrogenation. One of the layers of the layered structure has mainly at least one of the following functions: primary hydrogen storage, primary heat conduction and/or primary gas conduction. The functions of "primary hydrogen storage", "primary heat conduction" and/or "primary gas conduction" are understood to mean that the respective layer fulfills at least one of these functions as a main object in one region of the composite material compact. For instance, it is possible that a layer is utilized primarily for hydrogen storage, but is simultaneously also capable of providing at least a certain thermal conductivity. It may be the case here that at least one other layer is present which assumes the primary task of heat conduction, which means that the majority of the amount of heat is dissipated from the compressed material composite via this layer. In this case, it is on the other hand possible to utilize the primarily gas-conducting layer, through which, for example, the hydrogen can be passed into the material composite or else, for example, conducted out of it. In this case, the flowing fluid can also entrain heat.

The term "hydrogen storage means" describes a reservoir vessel in which hydrogen can be stored by means of hydrogen-storing elements or components which for the most part remain intrinsically dimensionally stable and are in the form, for example, of sheets, blocks, tablets or pellets. This can be done using conventional methods of saving and storage of hydrogen, for example compressed gas storage, such as storage in pressure vessels by compression with compressors, or liquefied gas storage, such as storage in liquefied form by cooling and compression. Further alternative forms of storage of hydrogen are based on solids or liquids, for example metal hydride storage means, such as storage as a chemical compound between hydrogen and a metal or an alloy, or adsorption storage, such as adsorptive storage of hydrogen in highly porous materials. In addition, for storage and transport of hydrogen, there are also possible hydrogen storage means which temporarily bind the hydrogen to organic substances, giving rise to liquid compounds that can be stored at ambient pressure, called "chemically bound hydrogen".

"Element" and "component" each refer to a component of any geometry having hydrogen storage capacity, for example in sheet, cylinder, block or slab form or the like. One or more prefabricated hydrogen storage components of this kind are positioned in the (pressure) vessel of a hydrogen storage means.

The term "layers" means that preferably one material, but also two or more material laminas, are in an arrangement and these material laminas can be delimited from their direct environment. For example, it is possible for different materials to be poured in successively in loose form, such that adjacent layers are in direct contact with one another. In a preferred configuration, the hydrogenatable layer is arranged directly adjacent to a thermally conductive layer, such that the heat that arises on absorption of hydrogen and/or release of hydrogen can be released from the hydrogenatable material directly to the adjacent layer.

One of the layers may, for example, be produced by spray application. An example of a suitable method for this purpose is one known in other sectors by the term "wet powder spraying". In the context of the disclosure is made by way of example to the article "Wet powder spraying—a process for the production of coatings" by A. Ruder, H. P. Buchkremer, H. Jansen, W. Malléner, D. Stöver published in "Surface and Coatings Technology", volume 53, issue 1, Jul. 24, 1992, pages 71-74. WO-A-2008 006 796, on the other hand, reveals how a material can be processed. In that case, however, there has been no use of any hydrogenatable material, let alone any production of a hydrogen storage means or a layer therefor. In principle, however, this document shows how spray application can be enabled. Likewise cited therein are other methods of layer formation as well. As well as spraying, it is alternatively possible to employ deposition of an electrochemical nature in order to obtain desired layer formation. Layer formation is also possible, for example, by means of screenprinting.

The contents of the publications and literature sources cited above and any still to be cited below are hereby incorporated by reference in the subject matter of the present patent application.

In a further method by which a layer can be formed, preferably surface-coated fibers are combined to form bundles. These bundles are, for example, stretched and then cut in order to obtain, for example, a layer comprising short fibers. The surface coating is preferably hydrogen-permeable. If the material of the fibers is hydrogen-storing, the coating can especially form protection against oxidation.

Preferably, a hydrogen storage means is provided, comprising a first material and a second material at separate locations from one another, each of which form separate layers adjacent to one another, preferably abutting one another, the first material comprising a primarily hydrogen-storing material and the second material being a primarily heat-conducting material, with the primarily heat-conducting material extending preferably from the interior of the hydrogen storage element outward.

In a development of the hydrogen storage means, a gradient is formed between the first and second layers, along which a transition from the first to the second layer is accomplished via a change in the respective material content (density content) of the first and second materials.

A gradient can be brought about, for example, by moving a bar, in the case of several bars by means of a comb, or generally by means of a contact element having a different geometry, in the materials of the first and second layers, when they are yet to be further processed, for example yet to be laid down with compression together. Through the controlled gradient formation, it is especially possible to be able to provide a large heat transfer area between the first and second materials.

A further configuration of the hydrogen storage means has components in the form of a core-shell structure, in which the core comprises a first material and the shell comprises a different second material, the first material and/or the second material comprising a hydrogen-storing material, the components preferably being selected from the group comprising powders, granules, flakes, fibers and/or other geometries.

It is further preferable when the hydrogen storage element comprises the second material of the shell in the form of a polymer configured so as to be at least hydrogen-permeable.

It may also be the case that the hydrogen storage component has a structure in which the core comprises a primarily heat-conducting material and the shell a primarily hydrogen-storing material.

In a development, the core comprises a primarily hydrogen-storing material and the shell a primarily heat-conducting material, the heat-conducting material being hydrogen-permeable.

Preferably, the hydrogen-storing material has a hydrogen-permeable coating which prevents oxidation of the hydrogen-storing material, the coating preferably being hydrogen-storing. This coating can alternatively be used to prevent oxidation or else additionally serve for coherence, i.e. for mechanical bonding of the hydrogenatable material present, for example, in particulate form.

Through the use of at least one polymer, the matrix can impart good optical, mechanical, thermal and/or chemical properties to the material. For example, the hydrogen storage means, by virtue of the polymer, may have good thermal stability, resistance to the surrounding medium (oxidation resistance, corrosion resistance), good conductivity, good hydrogen absorption and storage capacity or other properties, for example mechanical strength, which would otherwise not be possible without the polymer. It is also possible to use polymers which, for example, do not enable storage of hydrogen but do enable high expansion, for example polyamide or polyvinyl acetates.

According to the invention, the polymer may be a homopolymer or a copolymer. Copolymers are polymers composed of two or more different types of monomer unit. Copolymers consisting of three different monomers are called terpolymers. According to the invention, the polymer, for example, may also comprise a terpolymer.

Preferably, the polymer (homopolymer) has a monomer unit which, as well as carbon and hydrogen, preferably additionally includes at least one heteroatom selected from sulfur, oxygen, nitrogen and phosphorus, such that the polymer obtained, in contrast to polyethylene, for example, is not entirely nonpolar. It is also possible for at least one halogen atom selected from chlorine, bromine, fluorine, iodine and astatine to be present. Preferably, the polymer is a copolymer and/or a terpolymer in which at least one monomer unit, in addition to carbon and hydrogen, additionally includes at least one heteroatom selected from sulfur, oxygen, nitrogen and phosphorus and/or at least one halogen atom selected from chlorine, bromine, fluorine, iodine and astatine is present. It is also possible that two or more monomer units have a corresponding heteroatom and/or halogen atom.

The polymer preferably has adhesive properties with respect to the hydrogen storage material. This means that it adheres well to the hydrogen storage material itself and hence forms a matrix having stable adhesion to the hydrogen storage material even under stresses as occur during the storage of hydrogen.

The adhesive properties of the polymer enable stable penetration of the material into a hydrogen storage means and the positioning of the material at a defined point in the hydrogen storage means over a maximum period of time, i.e. over several cycles of hydrogen storage and hydrogen release. A cycle describes the operation of a single hydrogenation and subsequent dehydrogenation. The hydrogen storage material should preferably be stable over at least 500 cycles, especially over at least 1000 cycles, in order to be able to use the material economically. "Stable" in the context of the present invention means that the amount of hydrogen which can be stored and the rate at which the hydrogen is stored, even after 500 or 1000 cycles, corresponds essentially to the values at the start of use of the hydrogen storage means. More particularly, "stable" means that the hydrogenatable material is kept at least roughly at the position within the hydrogen storage means where it was originally introduced into the storage means. "Stable" should especially be understood to the effect that no separation effects occur during the cycles, where finer particles separate and are removed from coarser particles.

The hydrogen storage material of the present invention is especially a low-temperature hydrogen storage material.

In the course of hydrogen storage, which is an exothermic process, temperatures of up to 150° C. therefore occur. A polymer which is used for the matrix of a corresponding hydrogen storage material therefore has to be stable at these temperatures. A preferred polymer therefore does not break down up to a temperature of 180° C., especially up to a temperature of 165° C., especially up to 145° C.

More particularly, the polymer is a polymer having a melting point of 100° C. or more, especially of 105° C. or more, but less than 150° C., especially of less than 140° C., particularly of 135° C. or less. Preferably, the density of the polymer, determined according to ISO 1183 at 20° C., is 0.7 g/cm³ or more, especially 0.8 g/cm³ or more, preferably 0.9 g/cm³ or more, but not more than 1.3 g/cm³, preferably not more than 1.25 g/cm³, especially 1.20 g/cm³ or less. The tensile strength according to ISO 527 is preferably in the range from 10 MPa to 100 MPa, especially in the range from 15 MPa to 90 MPa, more preferably in the range from 15 MPa to 80 MPa. The tensile modulus of elasticity according to ISO 527 is preferably in the range from 50 MPa to 5000 MPa, especially in the range from 55 MPa to 4500 MPa, more preferably in the range from 60 MPa to 4000 MPa. It has been found in, surprisingly, polymers having these mechanical properties are particularly stable and have good processability. More particularly, they enable stable coherence between the matrix and the hydrogenatable material embedded therein, such that the hydrogenatable material remains at the same position within the hydrogen storage means over several cycles. This enables a long lifetime of the hydrogen storage means.

More preferably, in the context of the present invention, the polymer is selected from EVA, PMMA, EEAMA and mixtures of these polymers.

EVA (ethyl vinyl acetate) refers to a group of copolymers of ethylene and vinyl acetate having a proportion of vinyl acetate in the range from 2% by weight to 50% by weight. Lower proportions of vinyl acetate lead to the formation of rigid films, whereas higher proportions lead to greater adhesiveness of the polymer. Typical EVAs are solid at room temperature and have tensile elongation of up to 750%. In addition, EVAs are resistant to stress cracking. EVA has the following general formula (I):

(formula (I))

EVA in the context of the present invention preferably has a density of 0.9 g/cm³ to 1.0 g/cm³ (according to ISO 1183). Yield stress according to ISO 527 is especially 4 to 12 MPa, preferably in the range from 5 MPa to 10 MPa, particularly 5 to 8 MPa. Especially suitable are those EVAs which have tensile strengths (according to ISO 527) of more than 12 MPa, especially more than 15 MPa, and less than 50 MPa, especially less than 40 MPa, particularly 25 MPa or less. Elongation at break (according to ISO 527) is especially >30% or >35%, particularly >40% or 45%, preferably >50%. The tensile modulus of elasticity is preferably in the range from 35 MPa to 120 MPa, particularly from 40 MPa to 100 MPa, preferably from 45 MPa to 90 MPa, especially from 50 MPa to 80 MPa. Suitable EVAs are sold, for example, by Axalta Coating Systems LLC under the Coathylene® CB 3547 trade name.

Polymethylmethacrylate (PMMA) is a synthetic transparent thermoplastic polymer having the following general structural formula (II):

(formula (II))

The glass transition temperature, depending on the molar mass, is about 45° C. to 130° C. The softening temperature is preferably 80° C. to 120° C., especially 90° C. to 110° C. The thermoplastic copolymer is notable for its resistance to weathering, light and UV radiation.

PMMA in the context of the present invention preferably has a density of 0.9 to 1.5 g/cm³ (according to ISO 1183), especially of 1.0 g/cm³ to 1.25 g/cm³. Especially suitable are those PMMAs which have tensile strength (according to ISO 527) of more than 30 MPa, preferably of more than 40 MPa, especially more than 50 MPa, and less than 90 MPa, especially less than 85 MPa, particularly of 80 MPa or less. Elongation at break (according to ISO 527) is especially <10%, particularly <8%, preferably <5%. The tensile modulus of elasticity is preferably in the range from 900 MPa to 5000 MPa, preferably from 1200 to 4500 MPa, especially from 2000 MPa to 4000 MPa. Suitable PMMAs are sold, for example, by Ter Hell Plastics GmbH, Bochum, Germany, under the trade name of 7M Plexiglas® pellets.

EEAMA is a terpolymer formed from ethylene, acrylic ester and maleic acid anhydride monomer units. EEAMA has a melting point of about 102° C., depending on the molar mass. It preferably has a relative density at 20° C. (DIN 53217/ISO 2811) of 1.0 g/cm$^3$ or less and 0.85 g/cm$^3$ or more. Suitable EEAMAs are sold, for example, under the Coathylene® TB3580 trade name by Axalta Coating Systems LLC.

Preferably, the composite material comprises essentially the hydrogen storage material and the matrix. The proportion by weight of the matrix based on the total weight of the composite material is preferably 10% by weight or less, especially 8% by weight or less, more preferably 5% by weight or less, and is preferably at least 1% by weight and especially at least 2% by weight to 3% by weight. It is desirable to minimize the proportion by weight of the matrix. Even though the matrix is capable of storing hydrogen, the hydrogen storage capacity is not as significant as that of the hydrogen storage material itself. However, the matrix is needed in order firstly to keep any oxidation of the hydrogen storage material that occurs at a low level or prevent it entirely and to assure coherence between the particles of the material.

It is preferable that the matrix is a polymer having low crystallinity. The crystallinity of the polymer can considerably alter the properties of a material. The properties of a semicrystalline material are determined both by the crystalline and the amorphous regions of the polymer. As a result, there is a certain relationship with composite materials, which are likewise formed from two or more substances. For example, the expansion capacity of the matrix decreases with increasing density.

The matrix may also take the form of prepregs. Prepreg is the English abbreviation of "preimpregnated fibers". Prepregs are semifinished textile products preimpregnated with a polymer, which are cured thermally and under pressure for production of components. Suitable polymers are those having a highly viscous but unpolymerized thermoset polymer matrix. The polymers preferred according to the present invention may also take the form of a prepreg.

The fibers present in the prepreg may be present as a pure unidirectional layer, as a fabric or scrim. The prepregs may, in accordance with the invention, also be comminuted and be processed as flakes or shavings together with the hydrogenatable material to give a composite material.

In one version of the present invention, the polymer may take the form of a liquid which is contacted with the hydrogenatable material. One meaning of "liquid" here is that the polymer is melted. However, the invention also encompasses dissolution of the polymer in a suitable solvent, in which case the solvent is removed again after production of the composite material, for example by evaporation. However, it is also possible that the polymer takes the form of pellets which are mixed with the hydrogenatable material. As a result of the compaction of the composite material, the polymer softens, so as to form the matrix into which the hydrogenatable material is embedded. If the polymer is used in the form of particles, i.e. of pellets, these preferably have an $x_{50}$ particle size (volume-based particle size) in the range from 30 μm to 60 μm, especially 40 μm to 45 μm. The $x_{90}$ particle size is especially 90 μm or less, preferably 80 μm or less.

The hydrogenatable material can absorb the hydrogen and, if required, release it again. In a preferred embodiment, the material comprises particulate materials in any 3-dimensional configuration, such as particles, pellets, fibers, preferably cut fibers, flakes and/or other geometries. More particularly, the material may also take the form of sheets or powder. In this case, the material does not necessarily have a homogeneous configuration. Instead, the configuration may be regular or irregular. Particles in the context of the present invention are, for example, virtually spherical particles, and likewise particles having an irregular, angular outward shape. The surface may be smooth, but it is also possible that the surface of the material is rough and/or has unevenness and/or depressions and/or elevations. According to the invention, a hydrogen storage means may comprise the material in just one specific 3-dimensional configuration, such that all particles of the material have the same spatial extent. However, it is also possible that a hydrogen storage means comprises the material in different configurations/geometries. By virtue of a multitude of different geometries or configurations of the material, the material can be used in a multitude of different hydrogen storage means.

Preferably, the material comprises hollow bodies, for example particles having one or more cavities and/or having a hollow shape, for example a hollow fiber or an extrusion body with a hollow channel. The term "hollow fiber" describes a cylindrical fiber having one or more continuous cavities in cross section. Through the use of a hollow fiber, it is possible to combine a plurality of hollow fibers to give a hollow fiber membrane, by means of which absorption and/or release of the hydrogen from the material can be facilitated because of the high porosity.

Preferably, the hydrogenatable material has a bimodal size distribution. In this way, a higher bulk density and hence a higher density of the hydrogenatable material in the hydrogen storage means can be enabled, which increases the hydrogen storage capacity, i.e. the amount of hydrogen which can be stored in the storage means.

According to the invention, the hydrogenatable material may comprise, preferably consist of, at least one hydrogenatable metal and/or at least one hydrogenatable metal alloy.

Other hydrogenatable materials used may be:
alkaline earth metal and alkali metal alanates,
alkaline earth metal and alkali metal borohydrides,
metal-organic frameworks (MOFs) and/or
clathrates,
and, of course, respective combinations of the respective materials.

According to the invention, the material may also include non-hydrogenatable metals or metal alloys.

According to the invention, the hydrogenatable material may comprise a low-temperature hydride and/or a high-temperature hydride. The term "hydride" refers to the hydrogenatable material, irrespective of whether it is in the hydrogenated form or the non-hydrogenated form. Low-temperature hydrides store hydrogen preferably within a temperature range between −55° C. and 180° C., especially between −20° C. and 150° C., particularly between 0° C. and 140° C. High-temperature hydrides store hydrogen preferably within a temperature range of 280° C. upward, especially 300° C. upward. At the temperatures mentioned, the hydrides cannot just store hydrogen but can also release it, i.e. are able to function within these temperature ranges.

Where 'hydrides' are described in this context, this is understood to mean the hydrogenatable material in its hydrogenated form and also in its non-hydrogenated form. According to the invention, in the production of hydrogen storage means, it is possible to use hydrogenatable materials in their hydrogenated or non-hydrogenated form.

With regard to hydrides and their properties, reference is made in the context of the disclosure to tables 1 to 4 in S. Sakietuna et al., International Journal of Energy, 32 (2007), p. 1121-1140.

Hydrogen storage (hydrogenation) can be effected at room temperature. Hydrogenation is an exothermic reaction. The heat of reaction that arises can be removed. By contrast, for the dehydrogenation, energy has to be supplied to the hydride in the form of heat. Dehydrogenation is an endothermic reaction.

For example, it may be the case that a low-temperature hydride is used together with a high-temperature hydride. For instance, in one configuration, it may be the case that, for example, the low-temperature hydride and the high temperature hydride are provided in a mixture in a layer of a second region. It is also possible for these each to be arranged separately in different layers or regions, especially also in different second regions. For example, it may be the case that a first region is arranged between these second regions. In a further configuration, a first region has a mixture of low- and high-temperature hydride distributed in the matrix. It is also possible that different first regions include either a low-temperature hydride or a high-temperature hydride.

Preferably, the hydrogenatable material comprises a metal selected from magnesium, titanium, iron, nickel, manganese, nickel, lanthanum, zirconium, vanadium, chromium, or a mixture of two or more of these metals. The hydrogenatable material may also include a metal alloy comprising at least one of the metals mentioned.

More preferably, the hydrogenatable material (hydrogen storage material) comprises at least one metal alloy capable of storing hydrogen and releasing it again at a temperature of 150° C. or less, especially within a temperature range from −20° C. to 140° C., especially from 0° C. to 100° C. The at least one metal alloy here is preferably selected from an alloy of the $AB_5$ type, the AB type and/or the $AB_2$ type. A and B here each denote different metals, where A and/or B are especially selected from the group comprising magnesium, titanium, iron, nickel, manganese, nickel, lanthanum, zirconium, vanadium and chromium. The indices represent the stoichiometric ratio of the metals in the particular alloy. According to the invention, the alloys here may be doped with extraneous atoms. According to the invention, the doping level may be up to 50 atom %, especially up to 40 atom % or up to 35 atom %, preferably up to 30 atom % or up to 25 atom %, particularly up to 20 atom % or up to 15 atom %, preferably up to 10 atom % or up to 5 atom %, of A and/or B. The doping can be effected, for example, with magnesium, titanium, iron, nickel, manganese, nickel, lanthanum or other lanthanides, zirconium, vanadium and/or chromium. The doping can be effected here with one or more different extraneous atoms. Alloys of the $AB_5$ type are readily activatable, meaning that the conditions needed for activation are similar to those in the operation of the hydrogen storage means. They additionally have a higher ductility than alloys of the AB or $AB_2$ type. Alloys of the $AB_2$ or of the AB type, by contrast, have higher mechanical stability and hardness compared to alloys of the $AB_5$ type. Mention may be made here by way of example of FeTi as an alloy of the AB type, $TiMn_2$ as an alloy of the $AB_2$ type and $LaNi_5$ as an alloy of the $AB_5$ type.

More preferably, the hydrogenatable material (hydrogen storage material) comprises a mixture of at least two hydrogenatable alloys, at least one alloy being of the $AB_5$ type and the second alloy being an alloy of the AB type and/or the $AB_2$ type. The proportion of the alloy of the $AB_5$ type is especially 1% by weight to 50% by weight, especially 2% by weight of 40% to weight, more preferably 5% by weight to 30% by weight and particularly 5% by weight to 20% by weight, based on the total weight of the hydrogenatable material.

The hydrogenatable material (hydrogen storage material) is preferably in particulate form (particles).

The particles especially have a particle size $x_{50}$ of 20 µm to 700 µm, preferably of 25 µm to 500 µm, particularly of 30 µm to 400 µm, especially 50 µm to 300 µm. $x_{50}$ means that 50% of the particles have a median particle size equal to or less than the value mentioned. The particle size was determined by means of laser diffraction, but can also be effected by sieve analysis, for example. The median particle size in the present case is the particle size based on weight, the particle size based on volume being the same in the present case. What is reported here is the particle size of the hydrogenatable material before it is subjected to hydrogenation for the first time. During the storage of hydrogen, stresses occur within the material, which can lead to a reduction in the $x_{50}$ particle size over several cycles.

Preferably, the hydrogenatable material is incorporated in the matrix to such a firm degree that it decreases in size on storage of hydrogen. Preference is therefore given to using, as hydrogenatable material, particulate material which breaks up while the matrix remains at least predominantly undestroyed. This result is surprising, since it was expected that the matrix would if anything tend to break up on expansion as a result of the increase in volume of the hydrogenatable material during the storage of hydrogen when there is high expansion because of the increase in volume. It is assumed at present that the outside forces acting on the particles, as a result of the binding within the matrix, when the volume increases, lead to breakup together with the stresses within the particles resulting from the increase in volume. Breakup of the particles was discovered particularly clearly on incorporation into polymer material in the matrix. The matrix composed of polymer material was capable of keeping the particles broken up in this way in a stable fixed position as well.

Tests have incidentally shown that, in the case of utilization of a binder, especially of an adhesive binder in the matrix for fixing of these particles, particularly good fixed positioning within the matrix is enabled. A binder content may preferably be between 2% by volume and 3% by volume of the matrix volume.

Preferably, there is a change in the particle size because of breakup of the particles resulting from the storage of hydrogen by a factor of 0.6, more preferably by a factor of 0.4, based on the $x_{50}$ particle size at the start and after 100 storage operations.

For example, it may be the case that a low-temperature hydride is used together with a high-temperature hydride. For instance, in one embodiment of the invention, it may be the case that, for example, the low-temperature hydride and the high-temperature hydride are provided in a mixture in a layer of a second region of the hydrogen storage element. These may also be arranged separately in different layers, especially also in different regions, of one and the same layer of the hydrogen storage element. For example, it may be the case that another region is arranged between these elements. In a further configuration, a region comprises a mixture of low- and high-temperature hydride distributed in a matrix. It is also possible that different regions of the element comprise either a low-temperature hydride or a high-temperature hydride.

In a further configuration of the invention, the hydrogen storage means has a high-temperature hydride vessel and a low-temperature vessel. The high-temperature hydrides may generate temperatures of more than 350° C., which have to be dissipated. This heat is released very rapidly and can be utilized, for example, for heating of a component thermally associated with the hydrogen storage element. High-temperature hydrides utilized may, for example, be metal powders based on titanium. The low-temperature hydride, by contrast, assumes temperatures within a range preferably between −55° C. and 155° C., especially preferably within a temperature range between 80° C. and 140° C. A low-temperature hydride is, for example, $Ti_{0.8}Zr_{0.2}CrMn$ or $Ti_{0.98}Zr_{0.02}V_{0.43}Cr_{0.05}Mn_{1.2}$. One configuration envisages transfer of hydrogen from the high-temperature hydride container to the low-temperature hydride container and vice versa, and storage therein in each case. By way of example, and forming part of the disclosure of the present patent application, reference is made for this purpose to DE-C 36 39 545.

In addition, for example, it is possible to utilize, as a matrix, a carbon matrix into which the low-temperature hydride is inserted. For example, the University of Utrecht thesis entitled "Carbon matrix confined sodium alanate for reversible hydrogen storage" by J. Gao, retrievable under http://dspace.library.uu.nl/handle/1874/256764, reveals how the hydrogenatable material to be used and the matrix can be matched to one another, such that it is possible to operate a hydrogen storage element at relatively low temperatures as well. With regard to hydrides and their properties, reference is made to tables 1 to 4 in B. Sakietuna et al., International Journal of Energy, 32 (2007), p. 1121-1140. Both publications/literature references are hereby incorporated by reference into the disclosure of the present patent application.

In addition, it is proposed that the expanded graphite be very substantially replaced by using a specific filling technique to introduce layers of hydrogen-storing material, preferably a hydride, and a heat-conducting material such as graphite into a shaping mold in order then to give, compressed together, a sandwich structure in which the graphite again assumes the task of heat conduction. For this purpose, it is possible, for example, to utilize a heat-conducting metal powder and/or normal natural graphite, the lenticular particles of which are preferably aligned horizontally on filling, such that it is possible to efficiently utilize the good conduction of heat in the direction of the hexagonal lattice structure. Alternatively, it is possible to use films or film pieces composed of rolled expanded graphite or flakes of this material or else graphite fabric. At the same time, laminas of materials that remain porous can be introduced in between as gas-guiding layers and compressed as well.

More particularly, it is possible to introduce at least the first and second materials together but separately from one another the cavity of a shaping mold, to fill this simultaneously, with relative movement between the cavity and the first and second materials to be fed in. In this way, it is possible to produce different patterns, for example wavy layers, helical geometries and screw geometries.

Further filling of a cavity is effected, for example, into a press cavity having a lower ram and an upper ram. For example, filling of the cavity may be undertaken layer by layer, in which case, for example, every new or every second or every third new layer is followed by immediate compaction by means of the upper and lower rams. This allows a particularly close association of, for example, the primarily heat-conducting material and the primarily hydrogen-storing material.

In a further concept of the invention, a process for producing a hydrogen storage element, preferably a hydrogen storage element as described above, is proposed, wherein separate layers of a hydrogen-storing material and a heat-conducting material are introduced into a press mold and these are compressed together to generate a sandwich structure, the heat-conducting material, on use of the sandwich structure as hydrogen storage element, assuming the task of conducting heat, preferably in a direction transverse to the direction of succession of the layers of the hydrogen storage element.

In one configuration of the process of the invention, a metal powder and/or normal natural graphite is/are utilized as heat-conducting material, in which case, on utilization of normal natural graphite, the lenticular particles thereof are preferably aligned horizontally in the course of filling, such that conduction of heat in the direction of a hexagonal lattice structure of the graphite structure can be utilized.

In a further configuration of the process of the invention, alternatively or additionally, one or more films composed of rolled expanded graphite, flakes of a rolled expanded graphite and/or a graphite fabric may be introduced into the sandwich structure as heat-conducting material.

It may also be the case that one of more layers of a material that remains porous are introduced into the sandwich structure as gas-guiding layers and compressed as well.

It is likewise possible, in a development of the invention, that two or more sandwich structures are pressed separately from one another and then arranged in a common vessel.

Preferably, the layers are compacted by means of a press, for example a rotary press or a revolving press. The principle of a rotary press is known, for example, from DE-B-10 2010 005 780, and also from DE-B-10 2005 019 132. The apparatuses presented in each case can also be utilized for the production of layers of a hydrogen storage means.

Preferably, the first and second layers are compressed together and form the sandwich structure. The compression can be effected, for example, with the aid of an upper ram and a lower ram by pressure. In addition, the compression can be effected via isostatic pressing. The isostatic press method is based on the physical law that pressure in liquids and gases propagates uniformly in all directions and generates forces on the areas subjected thereto, the sizes of which are directly proportional to these areas. The materials to be compressed can be introduced, for example, into the pressure vessel of a pressing system, for example, in a rubber mold. The pressure that acts on the rubber mold on all sides via the liquid in the pressure vessel compresses the enclosed materials (at least the first and second layers) in a uniform manner. It is also possible to insert a preform comprising at least the first and second layers into the isostatic press, for example into a liquid. By applying high pressures, preferably within a range from 500 to 6000 bar, the sandwich structure can be produced. The high pressures in isostatic pressing permit, for example, the creation of new material properties in the composite material.

It may additionally be the case that, alternatively or additionally, one or more films composed of a rolled expanded graphite, flakes of a rolled expanded graphite and/or a graphite fabric are introduced as heat-conducting material into the sandwich structure.

In a further configuration, one or more laminas of a material that remains porous are introduced into the sandwich structure as gas-guiding layers and compressed as well. Preferably, two or more sandwich structures are pressed separately from one another and then arranged in a common vessel.

Further advantageous configurations and also features are apparent from the figures which follow and the corresponding description. The individual features that are apparent from the figures and the description are merely illustrative and not restricted to the particular configuration. Instead, one or more features from one or more figures can be combined with other features from the above description to give further configurations. Therefore, the features are specified not in a restrictive manner but merely by way of example. The figures show.

Figure 1:
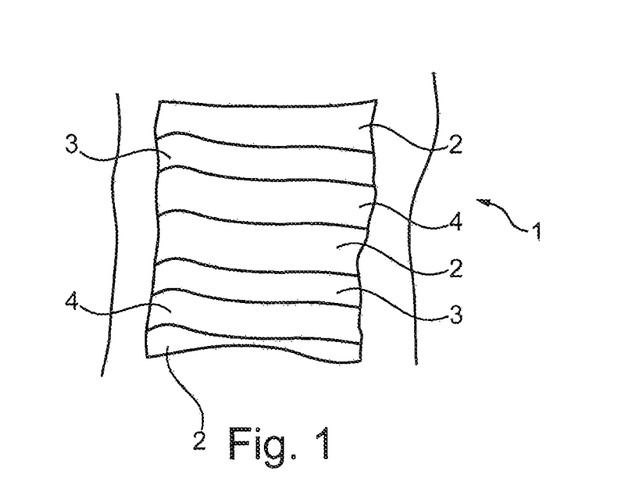
FIG. 1 a schematic view of a section of a hydrogen storage means having alternating layers, FIG. 2 a schematic view of a section of another hydrogen storage means or another portion of the hydrogen storage means according to FIG. 1 with a schematic representation of another layer arrangement having a non-planar 3-D form, and FIG. 3 a first and second layer shown in schematic form, having a gradient.

FIG. 1 shows a schematic view of a detail of a layer stack of a hydrogen storage means 1 having a plurality of cylindrically repeating layer sequences composed of one or more hydrogen storage components. For example, a first layer 2, a second layer 3 and a third layer 4 are each arranged in an alternating manner. As shown in this example, the first layer 2 comprises, for example, a heat-storing material, the second layer 3 a heat-removing material and the third layer 4 a gas-permeable material as gas-guiding layer. Compression, especially isostatic compression, makes it possible for there to be very intimate contact between the heat-conducting layer and the hydrogen-storing layer.

Figure 2:
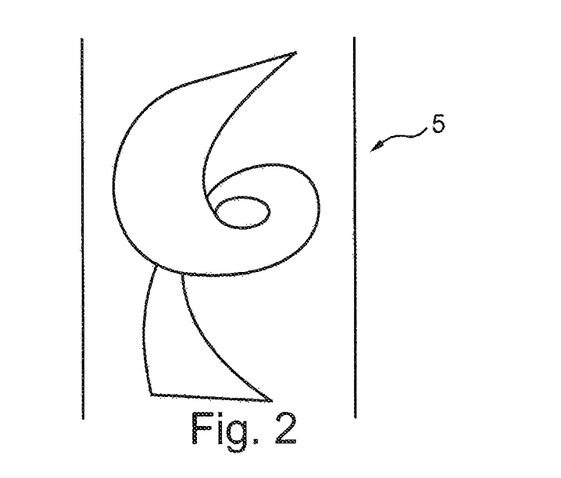

FIG. 2 shows a detail 5 of another or an identical hydrogen storage means with a schematic representation of another layer arrangement which is non-planar. As elucidated above, for example, a material may be supplied in such a way that a relative movement between cavity and material supply is executed. In this way, as shown, a helical layer is generated in a surrounding support layer. It is also possible to generate other geometries along an axis of the cavity. The helical layer has heat-conducting and/or gas-conducting properties. For production of a helical structure or another structure, preference is given to using an apparatus and a process as disclosed, for example, by DE 10 2014 006 374, to which reference is made in the context of the disclosure.

Figure 3:
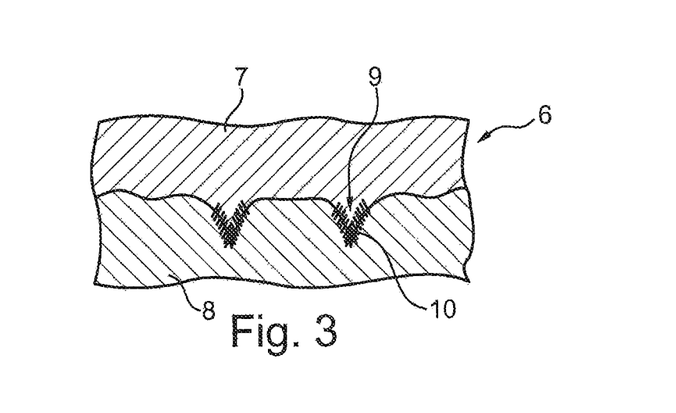

FIG. 3 shows a detail from a compressed sandwich structure 6 with a first layer 7 and a second layer 8. Between the first layer 7 and second layer 8, a groove 9 has been drawn with the aid of a body pulled through the two layers, which has led to formation of a gradient 10 in the sandwich structure. The gradient formation is indicated by the finer shading. Subsequent compression of these two layers prior to new supply of further layer-forming material results in particularly intensive "safeguarding" of the gradient in the sandwich structure.

The invention and various configurations of the invention will be apparent from the groups of features specified hereinafter, it being possible to combine individual features from one group with individual features from the other groups and/or with features of other embodiments and configurations disclosed in the above description of the invention (additions and omissions).

1. A hydrogen storage means having a hydrogen-permeable structure, preferably a porous structure, which is present as a component in the hydrogen storage means and serves for flow of a hydrogenous gas.

2. The hydrogen storage means, preferably according to point 1, characterized in that it comprises a first material and a second material at separate locations from one another, each of which form separate layers adjacent to one another, preferably abutting one another, the first material comprising a primarily hydrogen-storing material and the second material being a primarily heat-conducting material, with the primarily heat-conducting material extending preferably from the interior of the hydrogen storage means to an exterior of the hydrogen storage means.

3. The hydrogen storage means according to point 1 or 2, characterized in that a gradient is formed between the first and second layers, along which a transition from the first to the second layer is accomplished via a change in the respective material content of the first and second materials.

4. The hydrogen storage means preferably according to point 1, 2 or 3, characterized in that the hydrogen storage means has components in the form of a core-shell structure, in which the core comprises a first material and the shell comprises a different second material, the first material and/or the second material comprising a hydrogen-storing material, the components preferably being selected from the group comprising powders, granules, flakes, fibers and/or other geometries.

5. The hydrogen storage means according to point 4, characterized in that the second material of the shell comprises a polymer configured so as to be at least hydrogen-permeable.

6. The hydrogen storage means according to point 4 or 5, characterized in that the core comprises a primarily heat-conducting material and the shell a primarily hydrogen-storing material.

7. The hydrogen storage means according to point 3, characterized in that the core comprises a primarily hydrogen-storing material and the shell a primarily heat-conducting material, the heat-conducting material being hydrogen-permeable.

8. The hydrogen storage means according to any of the preceding points, characterized in that hydrogen-storing material has a hydrogen-permeable coating which prevents oxidation of the hydrogen-storing material, the coating preferably being hydrogen-storing.

9. A process for producing a hydrogen storage means, preferably a hydrogen storage means according to any of the preceding points, wherein separate layers comprising hydrogen-storing material and heat-conducting material are introduced into a press mold and these are compressed together to generate a sandwich structure, the heat-conducting material, on use of the sandwich structure as hydrogen storage means, assuming the task of conducting heat, preferably in the directions of expansion of the heat-conducting layer of the hydrogen storage means.

10. The process according to point 9, characterized in that a metal powder and/or normal natural graphite is utilized as heat-conducting material, wherein, in the case of utilization of normal natural graphite, the lenticular particles thereof are preferably aligned horizontally on filling, such that it is possible to efficiently utilize conduction of heat in the direction of a hexagonal lattice structure of the graphite structure.

11. The process according to point 9 or 10, characterized in that, alternatively or additionally, one or more films composed of a rolled expanded graphite, flakes of a rolled expanded graphite and/or a graphite fabric are introduced into the sandwich structure as heat-conducting material.

12. The process according to any of the preceding points, characterized in that one or more layers of a material that remains porous can be introduced into the sandwich structure as gas-guiding layers and compressed as well.

13. The process according to any of the preceding points, characterized in that two or more sandwich structures are pressed separately from one another and then arranged in a common vessel.

14. The process according to any of the preceding points, characterized in that the layers are compacted by means of a rotary compression or a revolving press.

15. The process according to any of the preceding points, characterized in that the layers are compressed isostatically.

16. The process according to any of the preceding points, characterized in that at least one low-temperature hydride and/or a high-temperature hydride is used for the hydrogen-storing material.

LIST OF REFERENCE NUMERALS 1 hydrogen storage element
2 first layer of the hydrogen storage element
3 second layer of the hydrogen storage element
4 third layer of the hydrogen storage element
5 section of a hydrogen storage means
6 sandwich structure
7 first layer of the sandwich structure
8 second layer of the sandwich structure
9 groove
10 gradient formation in the sandwich structure

We claim:

1. A process for producing a hydrogen storage means, the process comprising:
    introducing separate layers comprising a hydrogen-storing material and a heat-conducting material into a press mold in which the heat-conducting material takes the form of a free-flowing material and/or as a bed;
    compressing the separate layers of the hydrogen-storing material and the heat-conducting material together into a compact to generate a sandwich structure in which the hydrogen-storing material and the heat-conducting material are arranged in at least two intermeshing laminae and, during compression, the heat-conducting material in one of the laminae projects into the hydrogen-storage material in another one of the laminae to provide a three-dimensional distribution of the heat-conducting material within the laminae of the hydrogen-storing material in the compact;
    wherein the heat-conducting material, on use of the sandwich structure as hydrogen storage means, assumes the task of conducting heat.

2. The process according to claim 1, wherein a metal powder and/or normal natural graphite is utilized as heat-conducting material.

3. The process according to claim 2, wherein, in the case of utilization of normal natural graphite, the lenticular particles thereof are aligned horizontally on filling, such that it conducts heat in the direction of a hexagonal lattice structure of the graphite structure.

4. The process according to claim 1, wherein one or more films composed of a rolled expanded graphite, flakes of a rolled expanded graphite, and/or a graphite fabric are introduced into the sandwich structure as the heat-conducting material.

5. The process according to claim 1, wherein one or more layers of a material that remains porous are introduced into the sandwich structure as gas-guiding layers.

6. The process according to claim 1, wherein two or more sandwich structures are pressed separately from one another and then arranged in a common vessel.

7. The process according claim 1, wherein the layers are compacted by rotary compression or a revolving press.

8. The process according to claim 1, wherein the layers are compressed isostatically.

9. The process according to claim 1, wherein at least one low-temperature hydride and/or a high-temperature hydride is used for the hydrogen-storing material.

10. The process according to claim 1, wherein the heat-conducting material, on use of the sandwich structure as hydrogen storage means, conducts heat in the directions of expansion of the heat-conducting layer of the hydrogen storage means.

11. The process according to claim 1:
    wherein the hydrogen-storing material has a hydrogen storage capacity; and
    wherein the heat-conducting material is arranged primarily in a plane of extension of any shape with subregions of the layer having one or more alignments differing from this plane of extension and the heat-conducting material is embedded into the hydrogen-storing material and is in thermal contact with the hydrogen-storing material so as to conduct heat thereto and therefrom and has, in some regions, a different three-dimensional distribution within the sandwich structure.

12. The process according to claim 11, wherein the three-dimensional distribution of the heat-conducting material has repeating sections and each section has three-dimensional distributions.

13. The process according to claim 1, wherein a layer of the heat-conducting material has a helical or screw form.

14. The process according to claim 1, wherein the heat-conducting material has an additive which prevents alloy formation of the heat-conducting material with the hydrogen-storing material.

15. The process according to claim 14, wherein the heat-conducting material comprises aluminum or an aluminum alloy, wherein the hydrogen-storing material comprises magnesium or a magnesium alloy, and wherein the additive comprises graphite, expandable graphite and/or naturally expanded graphite which separates the aluminum or the aluminum alloy from the magnesium or magnesium alloy.

16. The process according to claim 14, wherein the additive is arranged as a separating layer between the hydrogen-storing material and the heat-conducting material.

17. The process according to claim 1, wherein the heat-conducting material is permeable to at least hydrogen, with horizontal alignment of lenticular graphite particles, such that it utilizes conduction of heat in a direction of a hexagonal lattice structure of a graphite structure.

18. The process according to claim 1, wherein the heat-conducting material is permeable to a fluid for removal of heat in the course of hydrogenation and for supply of heat in the course of dehydrogenation of the first material.

19. The process according to claim 1, wherein the hydrogen-storing material is in particulate form prior to compressing.

20. The process according to claim 1, wherein, during introducing separate layers comprising a hydrogen-storing material and a heat-conducting material into a press mold, the hydrogen-storing material and the heat-conducting material are poured in successively in loose form on top of one another such that the adjacent layers are in direct contact with one another.

* * * * *